Dec. 25, 1934.  A. B. JACOBUS  1,985,542
WEIGHING SCALES FOR CONCRETE AGGREGATES
Filed Feb. 23, 1932   3 Sheets-Sheet 1

INVENTOR
Alvah B. Jacobus
BY
ATTORNEY

Dec. 25, 1934.  A. B. JACOBUS  1,985,542
WEIGHING SCALES FOR CONCRETE AGGREGATES
Filed Feb. 23, 1932   3 Sheets-Sheet 2
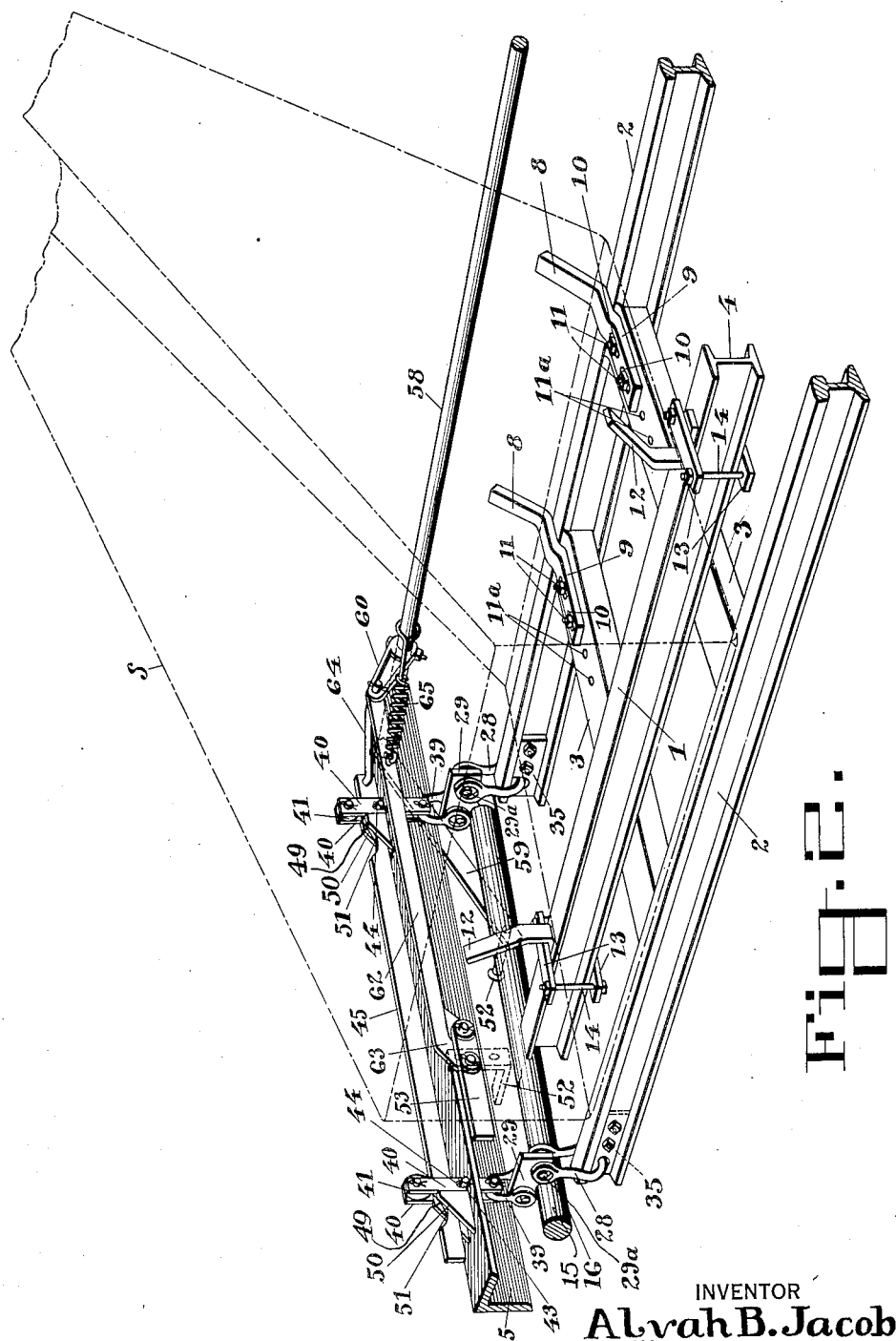
INVENTOR
Alvah B. Jacobus
BY
ATTORNEY Dec. 25, 1934.  A. B. JACOBUS  1,985,542
WEIGHING SCALES FOR CONCRETE AGGREGATES
Filed Feb. 23, 1932   3 Sheets-Sheet 3
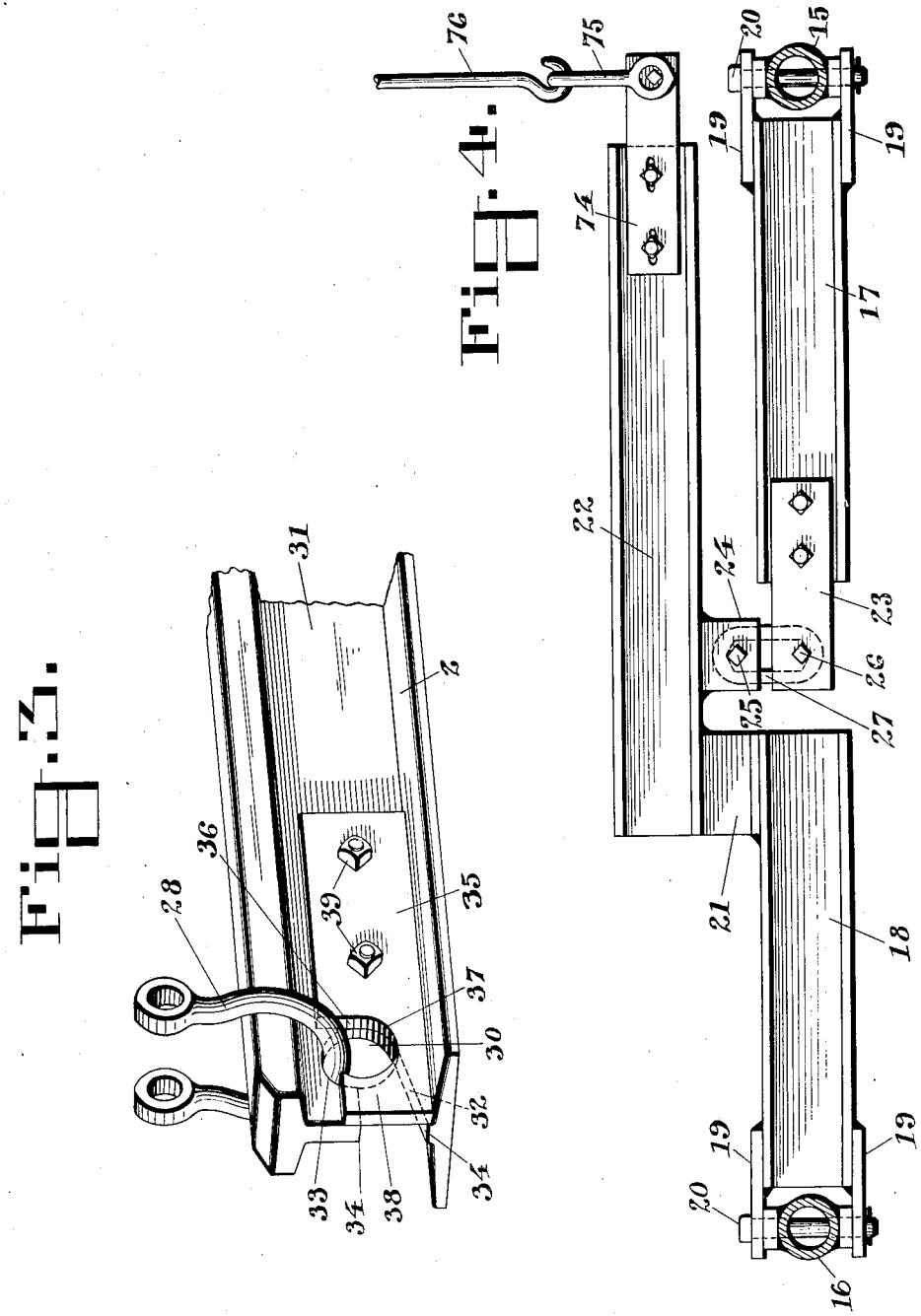
INVENTOR
Alvah B. Jacobus
BY
ATTORNEY Patented Dec. 25, 1934

1,985,542

UNITED STATES PATENT OFFICE 1,985,542

WEIGHING SCALES FOR CONCRETE AGGREGATES

Alvah B. Jacobus, Oak Park, Ill., assignor to E. and T. Fairbanks and Company, St. Johnsbury, Vt., a corporation of Vermont Application February 23, 1932, Serial No. 594,539

10 Claims. (Cl. 265—72)

This invention relates to improvements in scales of the charging type for weighing the aggregates forming the concrete mixture.

An important object is to provide automatically operated relieving gear mechanism for the scale levers under control of the skip.

Another object is to provide adjustable means for supporting and centering the skip on the scale platform.

Another object is to provide means for locking the platform suspension loops in position in the side bars.

Still another object is to provide a platform suspended on pipe levers of the pitless type of construction, co-operating with lever arms operatively connected to the scale beams.

In order that the nature of my invention may be fully understood, I have illustrated certain embodiments of the invention in the accompanying drawings, in which,—

Figure 2 is an isometric, detached view of the scale platform and co-operating parts, showing the method of the platform suspension and the relieving gear, as well as the position on the platform of the skip, as indicated in dotted outline.

Figure 3 is an isometric view of an end of one of the platform bars showing a platform suspension loop and means for locking it in position in the side bar.

Figure 4 is a longitudinal elevation, partly in section, of the co-operating lever arms and connections to the pipe levers and the draft rod.

Figure 1:
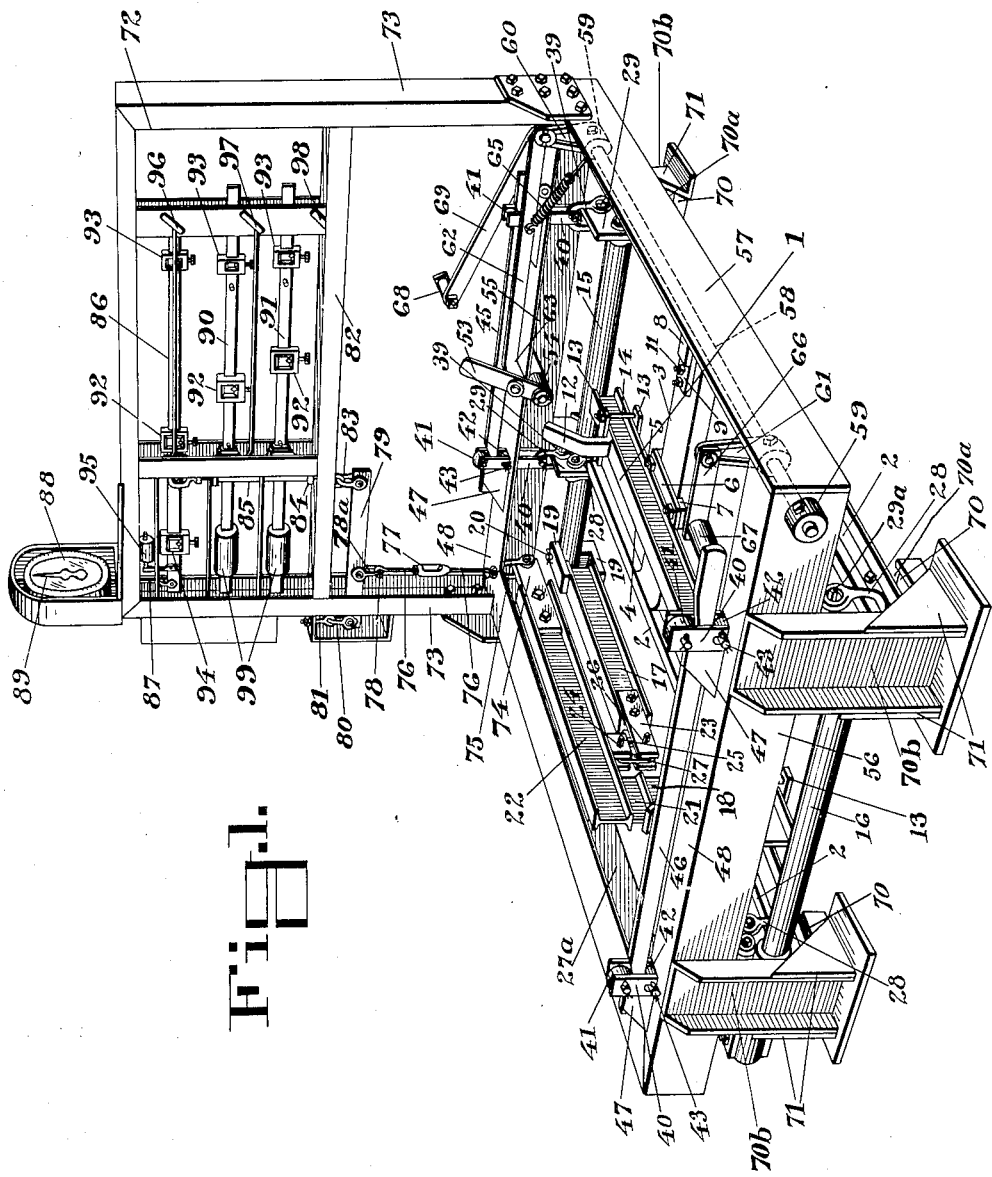
Figure 1 is an isometric view of the scale showing a preferred form of my invention.

Referring to the drawings 1 designates a platform comprising spaced, longitudinally extending side bars 2 and cross-bars 3 welded thereto and providing thereby a rigid connection with the side bars 2 so as to maintain the side bars in parallel relation with each other and equi-distant apart. This arrangement of the platform 1 provides a flexible construction, which allows the platform to be set out of level without loosening the scale parts or transferring any great part of the load from one bearing point to the other.

Mounted on the platform 1 is an adjustable skip supporting bar 4, adapted to be moved transversely of the cross-bar 3 to the desired position and clamped in position on the cross-bar 3 by bolts 5 in co-operation with clamping plates 6, which are supported by spaced bosses 7 welded to the supporting bar 4. Adjustable, inclined centering stops 8 for centering the skip S on the platform 1 are provided with an attaching portion 9 secured thereby to the cross-bars 3 and having spaced, elongated openings 10, through which openings bolts 11 are passed on through spaced openings 11a in the cross-bars 3, thereby providing for the adjustment and locking of the skip centering stops 8 at the desired position on the platform 1. Inclined skip centering stops 12 are adjustably mounted on the ends of the supporting bar 4 by clamping plates 13 and bolts 14 and are adapted to be moved in or out on the bar 4 so as to receive varying sizes of skips on the platform 1 and thus holding them in proper position thereon.

The scale lever system comprises two spaced pipe levers 15 and 16, one at each end of the scale and provided with longitudinally extending lever arms 17 and 18, each being connected at its outer end to the respective lever by spaced plates 19 welded thereto and a hinge pin 20, passing through the plates 19 and the lever, whereby each lever arm 17 and 18 is permitted to swing freely and transversely with relation to the pipe levers 15 and 16. The inner end of the lever arm 18 has welded thereto a connecting member 21, to which is welded a lever arm extension 22 extending over the lever arm 17 and spaced therefrom. The inner end of the lever arm 17 is provided with an adjustable forked nose iron 23, secured by adjustable bolts to the web of the lever arm 17, while located above it are two spaced lugs 24 welded to the lever arm extension 22. Inserted in the nose iron 23 and spaced lugs 24 are pivot bars 25 and 26, upon which is mounted a shackle 27, thus providing means for holding the shackle in position when subjected to shaking during transportation and also connecting the lever arm 17 and the co-operating lever arm extension 22, whereby the load borne by the pipe lever 15 is transferred to the lever arm extension 22 and hence to the weight indicating mechanism.

By employing the hinge pins 20 in connecting the levers 15 and 16 to the lever arms 17 and 18 and allowing thereby the lever arms to swing freely and transversely, the lever arms 17 and 18 are thus permitted to automatically adjust themselves and to assume such a position as will insure a perpendicular and freely operating connection for the shackle 27.

The platform 1 is suspended from the pipe levers 15 and 16 by spaced loops 28 attached to the ends of the side bars 2 and pivotally mounted on a pivot 29a carried by spaced lever plates 29, which are inserted in transverse slots in the pipe levers 15 and 16 and welded therein. Each loop 28 is hooked in a recess 30, formed in the web 31 at the ends of the side bars 2, and having a guideway 32, a circular inner portion 33 to hold the loop and a depending nose portion 34, after which the recesses 30 are closed by a locking plate 35, provided likewise with a guideway 36, circular inner portion 37 and upstanding nose portion 38, co-operating and coinciding with similar parts 32, 33 and 34 in the web of the side bar 2 and bolted to the web 31 by bolts 39. By this arrangement each loop 28 is readily attached to the particular side bar 2 and is held in a circular opening formed by the coinciding circular inner portions 33 and 37 and prevented by the co-operating nose portions 34 and 38 from becoming disengaged from the side bar 2.

In the relieving gear mechanism employed, the pipe levers 15 and 16 carrying the platform 1 are suspended by loops 39, attached to the lever plates 29, from spaced suspension hangers 40 carrying spaced rollers 41 and 42, the shaft 43 of the latter rollers being disposed in elongated openings 44 in the side plates of the hangers 40, in order to permit the hangers 40 to move up and down. The rollers 41 are adapted to ride on longitudinally slidable incline bars 45 and 46, each being mounted between the spaced rollers 41 and 42 and located at each end of the scale frame, thereby providing four supports for the pipe levers 15 and 16. Spaced guide plates 47, secured to the end top plates 48 of the frame, serve to guide and retain the hangers 40 together with the rollers 41 and 42 in their proper positions.

The incline bars 45 and 46 are each provided with recesses 49 having an inclined side 50 and a rounded base 51 forming a pocket, in which the upper rollers 41 are adapted to rest in one stage of their operation. The normal position of the incline bars 45 and 46 with the levers 15 and 16 in weighing position and with the skip S on the platform 1, is with the rollers 41 resting on the top of each incline bar 45 and 46 (Fig. 2). The skip S is provided on one side with a laterally extending skip pin 52, which is adapted, as the skip is raised from the platform 1 after weighing, to engage and operate a trip lever 53, which is pivotally mounted on the end of a stud 54, attached to the end plate 55 of the scale frame.

Mounted in the end plates 55 and 56 of the frame adjacent to the side plate 57 is a relieving gear actuating rod 58 provided with adjustable retaining collars 59 secured to each end. Fixedly attached at the ends of the actuating rod 58 are upstanding levers 60 and 61. Pivotally attached to the lever 60 is an operating bar 62 carrying at its free end a downwardly extending hooked member 63, to which the trip lever 53 is pivotally connected and with which the skip pin 52 engages and co-operates. An incline bar link 64, pivotally mounted on the lever 60, (Fig. 2) is pivotally connected to the adjacent end of the incline bar 45, while a spiral spring 65, attached to the link actuating rod 58 and the operating bar 62, serves to aid in retracting both the incline bars 45 and 46.

The lever 61 at the other end of the actuating rod 58 carries at its free end a pivotally attached intermediate connecting link 66, which is likewise pivotally connected to a laterally extending stud 67 fixed to the adjacent end of the incline bar 46, by which arrangement the incline bars 45 and 46 are adapted to be moved in unison by the unified movement of the levers 60 and 61 under control of the actuating rod 58. A foot treadle 68 fixedly attached by its bar 69 to the end of the actuating rod 58 is adapted to operate the rod 58 and return the platform 1 and the weighing levers 15 and 16 to normal weighing position as hereinafter described.

The operation of the relieving gear mechanism is such that as the skip S is raised from the platform 1, after its contents have been weighed, the skip pin 52 coming in contact with the pivotally mounted trip lever 53 raises up the trip lever, (Fig. 2) thereby raising with it the co-operating hooked member 63 of the operating bar 62, which bar is thus pushed back to the right and the lever 60 is caused to turn in a clockwise direction carrying with it the incline bar link 64. This movement of the incline bar link 64, attached to the incline bar 45, causes the incline bar 45 to be pushed thereby to the right over the lower rollers 42, while the incline bar 46 at the opposite end of the frame is moved simultaneously in the same direction by the turning of the actuating rod 58, through the action of the intermediate connecting link 66 operatively attached to the incline bar 46. (Fig. 1.) When each incline bar 45 and 46 has moved a sufficient distance for the upper rollers 41 to start down the inclined sides 50 of the recesses 49 (Fig. 2), the action of the spiral spring 65 is adapted to complete the travel of the incline bars 45 and 46, whereby the upper rollers 41 are permitted to roll into and rest in the rounded bases 51 of the recesses 49 and thus lower the suspension hangers 40 together with the platform 1 to the relieved position (Fig. 1) and with the side bars 2 resting on stops 70 in the pockets 70a of the frame supports 70b at each corner of the frame, which are provided with side plates 71 to hold the platform in position and prevent its displacement. By this arrangement, when the side bars 2 are brought to rest on the stops 70, the loops 28 are automatically raised from engagement with the pivots 29a of the lever plates 29, thereby freeing the lever mechanism from operative connection with the platform 1 and thus preventing any injury thereto from impact of the skip or in case a loaded skip should drop on the platform.

When the empty skip has been returned to the platform 1, the operator steps on the foot treadle 68 and forces it down, thus moving the adjacent incline bar 45 and its companion incline bar 46 to the left through the combined movement of the levers 60 and 61 and the co-operating incline bar link 64 and intermediate connecting link 66 respectively (Fig. 1). By this movement the upper rollers 41 are carried up the inclined sides 50 of the recesses 49 and back to their normal weighing position on top of the incline bars 45 and 46 (Fig. 2), raising thereby the suspension hangers 40 together with the weighing levers 15 and 16 and raising the platform 1 clear of the stops 70, thus placing the platform 1 and weighing levers 15 and 16 again in weighing position.

Mounted on the end of the frame over the incline bar 45 is the weigh beam box 72 supported by standards 73 attached to the frame. The load on the platform 1 is transmitted through the levers 15 and 16 co-operating with the splice arms 17 and 18 attached thereto, and hence to the splice arm extension 22, to the end of which is adjustably secured a forked nose iron 74. Pivotally attached to the nose iron 74 by a shackle 75 are two vertical hooked rods 76, connected by a turnbuckle 77, and forming the draft rod 78, which is attached to a loop 78a pivotally connected to the shelf lever 79.

The shelf lever 79 is pivotally suspended by a loop 80, mounted in an eye bolt 81 attached to the shelf 82, and a loop 83 connected to a hooked rod 84, fastened to the spaced hanger beam connection or ladder 85, which is pivotally suspended from the main beam 86, whereby the load is transmitted to the main beam.

The main beam 86 is also connected by a rod 87 to a telltale balance indicator 88, which is adjusted so that the pointer 89 will stand at zero when the main beam 86 is in its balanced position for a predetermined weight in the skip S. The suspended hanger connection or ladder 85 is adapted to support the auxiliary beams 90 and 91, when operatively connected to the ladder 85, which auxiliary beams are provided to weigh additional ingredients as they are placed in the skip S. The main beam 86 is provided with gross poise 92 and a net poise 93 for indicating the weight in the skip S, also a tare or back poise 94 for offsetting the weight of the empty skip and the main beam 86 may be used for weighing any one of the ingredients placed in the skip, while an adjustable balance weight 95 is provided for counterbalancing the weight of the platform 1 and the scale lever mechanism. The beams 86, 90 and 91 are likewise provided with gross poises 92 and net poises 93, as well as suitable trigs 96, 97 and 98, and the auxiliary beams 90 and 91 are likewise each provided with a counterbalance weight 99.

In the cycle of operations beginning with an empty skip S on the platform and the weighing mechanism in position for weighing (Fig. 2) the main beam 86 is released from trig 96 and in weighing position, while the gross poise 92 on each main and auxiliary beam is set to represent the predetermined weight of each particular material to be weighed. The material represented by the main beam 86 is then poured into the skip until the pointer 89 of the indicator 88 indicates that the main beam is in balance. The trig 97 co-operating with auxiliary beam 90 is thus released and the material represented by that beam is dropped into the skip S until the pointer 89 indicates that the auxiliary beam 90 is in balance. If three materials are to be weighed, the trig 98 on the second auxiliary beam 91 would be released and the additional material poured into the skip S until the pointer 89 indicates that the beam 91 is in balance and then the skip would be fully loaded.

The operator would then operate the hoisting mechanism, not shown, to raise the skip to a dumping position, while the skip as it leaves the platform automatically trips the relieving gear, which causes the levers 15 and 16 to drop and thus place the scale mechanism in position to receive the empty skip as it is again lowered to the platform (Fig. 1), as previously described.

The trigs 97 and 98 are normally set to lock the auxiliary beams 90 and 91, thereby releasing them from the scale mechanism, while the main beam 86 remains free to operate.

When the empty skip S has been returned to the platform 1 the scale is in position for another weighing operation, which is initiated by the operator pressing the foot treadle 68 and thus causing the platform 1 and weighing levers 15 and 16 to be raised to the weighing position.

While I have shown a preferred embodiment of my invention, it is evident that various modifications of the invention may be made that will come within the scope of the invention and I do not desire, therefore, to be limited to the exact details of construction shown and described.

I claim:—

1. In weighing scales for concrete aggregates, lever mechanism comprising opposed pipe levers located at each end of the scale and having spaced lever plates secured thereto, a platform pivotally suspended from the said lever plates and adapted to support a skip, relieving gear mechanism pivotally connected to the said lever plates and adapted to raise and lower the said levers, and means carried by the said skip adapted to co-operate with and control the operation of the relieving gear mechanism in lowering the levers to their relieved position.

2. In weighing scales for concrete aggregates, lever mechanism comprising opposed pipe levers located at each end of the scale and having spaced lever plates secured thereto, a platform pivotally suspended from the said lever plates and adapted to support a skip, and relieving gear mechanism comprising a reciprocable incline bar located above each lever and having spaced suspension hangers mounted thereon and pivotally connected to the said lever plates, and means for reciprocating the said incline bars and thereby alternately permitting the suspension hangers with the platform to be lowered and raised by causing the suspension hangers respectively to enter and then be raised from spaced recesses in the said incline bars by reason of the alternate reciprocation of the said incline bars.

3. In weighing scales for concrete aggregates, lever mechanism comprising opposed pipe levers located at each end of the scale and having spaced lever plates secured thereto, a platform pivotally suspended from the said lever plates and adapted to support a skip, and relieving gear mechanism comprising a reciprocable incline bar located above each lever and having suspension hangers formed of spaced side plates carrying spaced upper and lower rollers between which the said incline bars are mounted and adapted to slide, the said hangers being pivotally connected to the said lever plates and means for reciprocating the said incline bars and thereby alternately raising and lowering the said hangers and platform.

4. In weighing scales for concrete aggregates, lever mechanism comprising opposed pipe levers located at each end of the scale and having spaced lever plates secured thereto, a platform pivotally suspended from the said lever plates and adapted to support a skip, and relieving gear mechanism comprising a reciprocable incline bar located above each lever and having suspension hangers formed of spaced side plates carrying spaced upper and lower rollers between which the said incline bars are mounted and adapted to slide, the said incline bars being provided with a recess adjacent to each end adapted to receive the said upper rollers when the levers are lowered to their relieved or inoperative position, the said hangers being pivotally connected to the said lever plates and means for reciprocating the said incline bars and thereby alternately raising and lowering the said hangers and platform.

5. In weighing scales for concrete aggregates, lever mechanism comprising opposed pipe levers located at each end of the scale and having spaced lever plates secured thereto, a platform pivotally suspended from the said lever plates and adapted to support a skip, and relieving gear mechanism comprising a reciprocable incline bar located above each lever and having suspension hangers formed of spaced side plates carrying spaced upper and lower rollers between which the said incline bars are mounted and adapted to slide, means for reciprocating the said incline bars and thereby alternately raising and lowering the said hangers and platform, the said incline bars being provided with a recess adjacent to each end adapted to receive the said upper rollers when the levers are lowered to their relieved or inoperative position, and each recess being further provided with an inclined side on which the upper roller is adapted to travel as the inclined bar is moved forward and backward.

6. In weighing scales for concrete aggregates, lever mechanism comprising spaced levers located at each end of the scale, a platform pivotally suspended from the said levers and adapted to support a skip, relieving gear mechanism pivotally connected to the said levers, a skip pin laterally extending from the said skip, a pivotally mounted trip lever adapted to be engaged and operated by the skip pin when the skip is raised from the platform, and means controlled by the trip lever for actuating the relieving gear mechanism.

7. In weighing scales for concrete aggregates, lever mechanism comprising spaced levers located at each end of the scale, a platform pivotally suspended from the said levers and adapted to support a skip, relieving gear mechanism pivotally connected to the said levers, a skip pin laterally extending from the said skip, a pivotally mounted trip lever adapted to be engaged and operated by the skip pin when the skip is raised from the platform, and means controlled by the trip lever for actuating the relieving gear mechanism, comprising a longitudinally extending actuating rod having fixedly secured at each end an upstanding lever, each lever being operatively connected to its respective incline bar.

8. In weighing scales for concrete aggregates, lever mechanism comprising spaced levers located at each end of the scale, a platform pivotally suspended from the said levers and adapted to support a skip, relieving gear mechanism pivotally connected to the said levers, a skip pin laterally extending from the said skip, a pivotally mounted trip lever adapted to be engaged and operated by the skip pin when the skip is raised from the platform, means for actuating the relieving gear comprising a longitudinally extending actuating rod having fixedly secured at each end an upstanding lever, a downwardly extending operating bar pivotally connected to the trip lever and having a hooked end co-operating with the said skip pin, an incline bar link pivotally connected to one of the said upstanding levers and the adjacent end of the co-operating incline bar, and a connecting link pivotally connected to the other upstanding lever and its co-operating incline bar, whereby the incline bars are adapted to be moved in unison by the unified movement of the upstanding levers.

9. In weighing scales for concrete aggregates, lever mechanism comprising spaced levers located at each end of the scale, a platform pivotally suspended from the said levers and adapted to support a skip, relieving gear mechanism pivotally connected to the said levers, a skip pin laterally extending from the said skip, a pivotally mounted trip lever adapted to be engaged and operated by the skip pin when the skip is raised from the platform, means for actuating the relieving gear comprising a longitudinally extending actuating rod having fixedly secured at each end an upstanding lever, a downwardly extending operating bar pivotally connected to the trip lever and having a hooked end co-operating with the said skip pin, the said relieving gear mechanism including an incline bar link pivotally connected to one of the said upstanding levers and the adjacent end of the co-operating incline bar, a connecting link pivotally connected to the other upstanding lever and its co-operating incline bar, whereby the incline bars are adapted to be moved in unison by the unified movement of the upstanding levers, and a retractile spring attached to the said lever actuating rod and the operating bar and adapted to retract the said incline bars to their relieved position.

10. In weighing scales for concrete aggregates, lever mechanism comprising spaced weighing levers located at each end of the scale, a platform pivotally suspended from the said levers and adapted to support a skip, relieving gear mechanism pivotally connected to the said levers, a skip pin laterally extending from the said skip, a pivotally mounted trip lever adapted to be engaged and operated by the skip pin when the skip is raised from the platform, means for actuating the relieving gear comprising a longitudinally extending actuating rod having fixedly secured at each end an upstanding lever, a downwardly extending operating bar pivotally connected to the trip lever and having a hooked end co-operating with the said skip pin, the said relieving gear mechanism including an incline bar link pivotally connected to one of the said upstanding levers and the adjacent end of the co-operating incline bar, a connecting link pivotally connected to the other upstanding lever and its co-operating incline bar, whereby the incline bars are adapted to be moved in unison by the unified movement of the upstanding levers, a retractile spring attached to the said actuating rod and the operating bar and adapted to retract the said incline bars to their relieved position, and a foot treadle fixedly attached to the end of the actuating rod adapted to operate the said actuating rod and incline bars, thereby causing the platform and weighing levers to assume their operative weighing position.

ALVAH B. JACOBUS.